US006816115B1

(12) United States Patent
Redi et al.

(10) Patent No.: US 6,816,115 B1
(45) Date of Patent: Nov. 9, 2004

(54) SYSTEMS AND METHODS FOR ANTENNA SELECTION IN AN AD-HOC WIRELESS NETWORK

(75) Inventors: Jason Keith Redi, Belmont, MA (US); Keith William Manning, Arlington, MA (US); Mitchell Paul Tasman, Boston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 10/355,503

(22) Filed: Jan. 31, 2003

(51) Int. Cl.$^7$ .............................. H04B 7/00; G06F 15/16
(52) U.S. Cl. ....................................... 342/367; 709/232
(58) Field of Search ................................ 342/367–368; 709/232, 217–218; 455/25, 456.1, 456.5, 456.6, 562.1

(56) References Cited

U.S. PATENT DOCUMENTS

2001/0045914 A1 * 11/2001 Bunker ........................ 343/895
2002/0176390 A1 * 11/2002 Sparr et al. .................. 370/338

OTHER PUBLICATIONS

Y–B Ko et al., Medium access control protocols using directional antennas in ad hoc networks, INFOCOM 2000. Nineteenth Annual Joint Conference of the IEEE Computer and Communications Societies. Proceedings. IEEE, vol. 1, p. 13–21, Mar. 200.*
A. Nasipuri et al., A MAC protocol for mobile ad hoc networks using directional antennas, Wireless Communications and Networking Conference, 2000. WCNC. 2000 IEEE, vol. 3, p. 1214–1219, Sep. 2000.*
M. Mauve et al., A survey on position–based routing in mobile ad hoc networks, IEEE Networks, vol. 15(6), p. 30–39, Nov.–Dec. 2001.*
X. Hong et al., IEEE Network, vol. 16(4), p. 11–21, Jul.–Aug. 2002.*
Z. Huang et al., A busy–tone based directional MAC protocol for ad hoc networks, MILCOM 2002. Proceedings, vol. 2, p. 1233 1238, Oct. 2002.*
C. Florens et al., Scheduling algorithms for wireless ad–hoc sensor networks, Global Telecommunications Conference, GLOBECOM '02. IEEE, vol. 1, p 6–10, Nov. 2002.*
Z. Huang et al., A comparison study of omnidirectional and directional MAC protocols for ad hoc netowrks, Global Telecommunications Conference, 2002. GLOBECOM '02. IEEE, vol. 1, p. 57–61, Nov. 2002.*
Copy of U.S. patent application entitled "Systems and Methods for Three Dimensional Antenna Selection and Power Control in an AD–HOC Wireless Network", filed on Jan. 31, 2003; Jason Keith Redi et al; 58 pages.
Copy of U.S. patent application entitled "Systems and Methods for Directional Antenna Power Control in a Wireless Network"; filed on Jan. 31, 2003; Jason Keith Redi et al; 54 pages.

* cited by examiner

Primary Examiner—Gregory C. Issing
Assistant Examiner—F H Mull
(74) Attorney, Agent, or Firm—Ropes & Gray LLP

(57) ABSTRACT

A system selects an antenna for transmitting data from a node (105-1) in an ad-hoc, multi-hop, wireless network (100). The system receives a message from another node (105-2) of the wireless network (100), the message including location data associated with the other node (105-2). The system determines an angle from the node (105-1) to the other node (105-2), based on the location data, to produce a determined angle. The system selects an antenna from a plurality of antennas for transmitting data to the other node (105-2) based on the determined angle.

27 Claims, 10 Drawing Sheets

ANTENNA TO PLATFORM AZIMUTH TABLE
300

| ANTENNA NUM 310 | ANTENNA TYPE 315 | PLATFORM AZIMUTH MIN 320 | PLATFORM AZIMUTH MAX 325 | PLATFORM AZIMUTH CENTER 330 |
|---|---|---|---|---|
| 1 | TYPE_2 | 0 | 90 | 45 |
| 2 | TYPE_1 | 91 | 180 | 136 |
| 3 | TYPE_2 | 180 | 270 | 226 |
| ⋮ | ⋮ | ⋮ | ⋮ | ⋮ |
| M | TYPE_3 | 271 | 359 | 316 |

TABLE ENTRIES 305

FIG. 3

NEIGHBOR TO NORTH AZIMUTH TABLE
400

| NEIGHBOR ID 410 | NORTH AZIMUTH 415 |
|---|---|
| 1 | 32 |
| 2 | 22 |
| 3 | 51 |
| ⋮ | ⋮ |
| M | 200 |

TABLE ENTRIES 405

FIG. 4

SYSTEMS AND METHODS FOR ANTENNA
SELECTION IN AN AD-HOC WIRELESS
NETWORK

RELATED APPLICATION

The present application relates to co-pending Application Ser. No. 10/355,311, entitled "Systems and Methods for Directional Antenna Power Control in an Ad-Hoc Wireless Network," filed on a same date herewith.

The present application further relates to co-pending Application Ser. No. 10/355,556, entitled "Systems and Methods for Three Dimensional Antenna Selection and Power Control in an Ad-Hoc Wireless Network," filed on a same date herewith, the disclosure of which is incorporated by reference herein.

GOVERNMENT CONTRACT

The U.S. Government has a paid-up license in this invention and the right in limited circumstances to require the patent owner to license others on reasonable terms as provided for by the terms of Contract No. DAAD 19-01-C-0027, awarded by the Department of the Army.

FIELD OF THE INVENTION

The present invention relates generally to ad-hoc, multi-hop, wireless networks and, more particularly, to systems and methods for selecting antennas for transmission and reception at nodes in such networks.

BACKGROUND OF THE INVENTION

Wireless data communication is often required in an environment where communications infrastructure, such as base stations or a wired backbone network, does not exist or is uneconomical or impractical to use. For example, in military or emergency environments, adequate infrastructure often does not exist in necessary locations and constructing such an infrastructure would be either impractical or uneconomical for the short-term use that is often required. Mobile multi-hop wireless networks have, therefore, been developed to provide wireless data communications in such environments.

In a conventional mobile wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop wireless network to perform effectively, all nodes must, therefore, be prepared to route packets on behalf of other nodes.

Conventionally, wireless ad-hoc networks employ omni-directional antennas for sending and receiving routed packet data. Use of omni-directional antennas, however, has the drawback that spatial re-use of the shared frequency space is limited. This limited spatial re-use results in lower throughput and higher latencies that reduces the performance of ad-hoc networks.

Therefore, there exists a need for systems and methods that can increase the spatial re-use of the shared frequency space associated with wireless, ad-hoc, wireless networks.

SUMMARY OF THE INVENTION

Systems and methods consistent with the present invention address this and other needs by implementing directional antennas in nodes of an ad-hoc, multi-hop, wireless network. Consistent with the present invention, directional antennas, such as, for example, switched beam or steered beam types of directional antennas, may be used for transmitting and/or receiving packets. Location determining techniques, such as, for example, using Global Positioning System (GPS) signals, may be employed to determine locations of nodes in the network. The determined locations may be used as a basis for selecting an appropriate antenna of multiple directional antennas for transmitting and/or receiving data to/from other nodes in the ad-hoc network. Use of directional antennas, consistent with the present invention, permits the effective division of the shared frequency space into smaller regions, thus, increasing spatial re-use in the network. Increasing the spatial re-use results in higher throughput and lower latencies in the network, as compared to exclusive use of omni-directional antennas.

In accordance with the purpose of the invention as embodied and broadly described herein, a method of selecting an antenna for transmitting data in an ad-hoc wireless network includes receiving a first message from a node in the ad-hoc wireless network, where the message includes location data associated with the node. The method further includes selecting an antenna from multiple antennas based on the location data, and transmitting a second message to the node via the selected antenna.

In a further implementation consistent with the present invention, a method for selecting a transmit antenna in a wireless network including multiple nodes is provided. The method includes receiving a message from a first node of the multiple nodes, where the message includes location data associated with the first node. The method further includes determining an angle from a second node of the multiple nodes to the first node, based on the location data, to produce a determined angle. The method also includes selecting an antenna from multiple antennas for transmitting data to the first node based on the determined angle.

In an additional implementation consistent with the present invention, a method of notifying other nodes in an ad-hoc multi-hop wireless network of a first node's location is provided. The method includes determining a current heading and current location of the first node. The method further includes determining whether the current heading of the first node differs from a previous heading of the first node. The method also includes sending at least one message to the other nodes, based on whether the first node's current heading differs from the previous heading, the at least one message comprising information identifying the current location of the first node.

In yet another implementation consistent with the present invention, a method of determining a heading to a first node in an ad-hoc wireless network includes receiving a message from the first node, where the message includes an identifier associated with the first node and data indicating a location of the first node. The method further includes determining a heading of the first node relative to a second node, based on the location of the first node, to produce a determined heading. The method also includes storing the identifier and determined heading in an entry of a data table.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIGS. 3 and 4 illustrate exemplary data tables associated with each node of FIG. 1 consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention provide mechanisms for implementing multiple directional antennas in nodes of an ad-hoc, multi-hop, wireless network for transmitting and/or receiving packets. Use of directional antennas, consistent with the present invention, permits the effective division of the network shared frequency space into smaller regions, thus, increasing spatial re-use in the network that results in higher throughput and lower latencies in the network.

EXEMPLARY AD-HOC NETWORK

Figure 1:
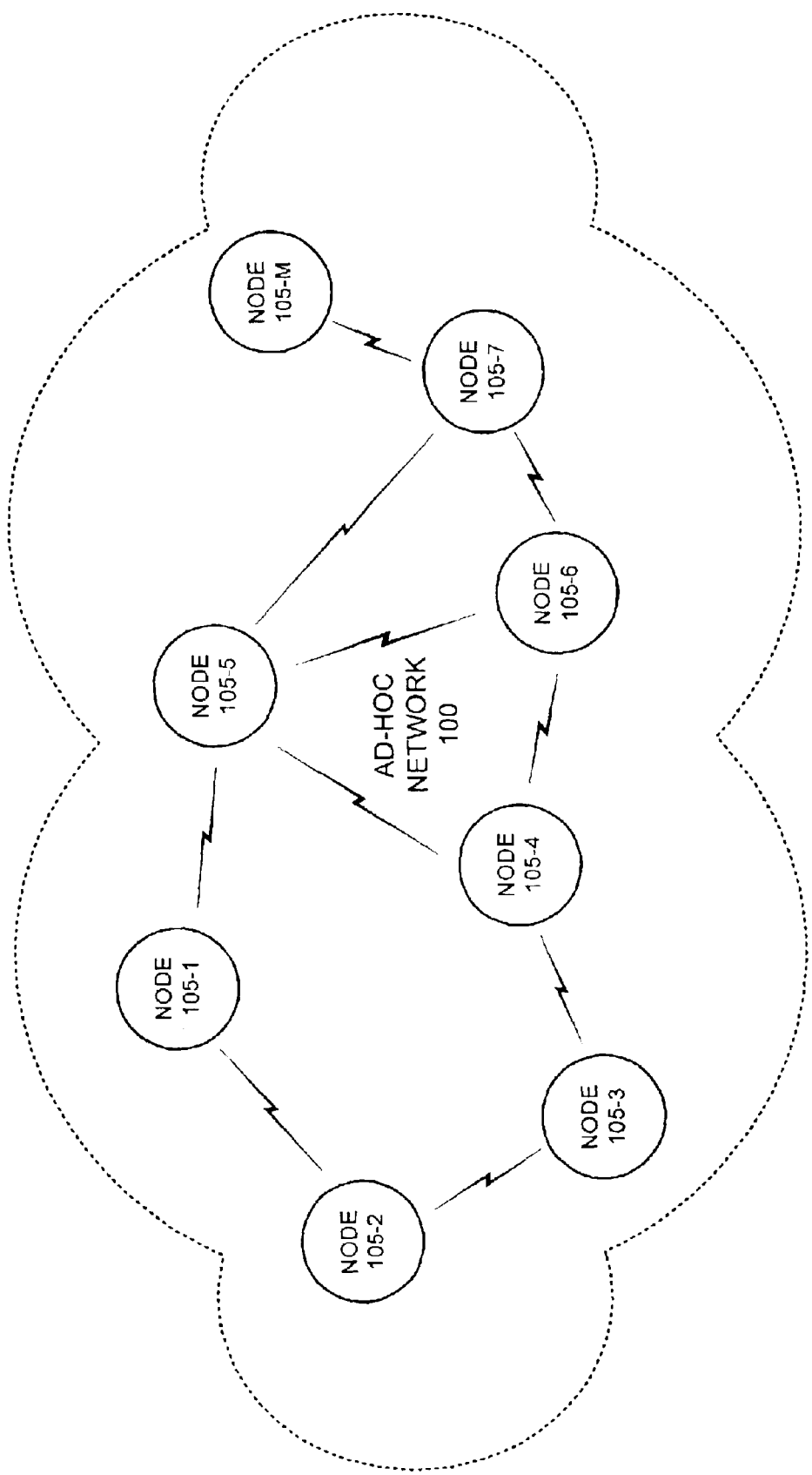
FIG. 1 illustrates an exemplary ad-hoc, multi-hop, wireless network in which systems and methods, consistent with the present invention, may be implemented.

FIG. 1 illustrates an exemplary ad-hoc, multi-hop, wireless network 100 consistent with the present invention. Network 100 may include multiple wireless nodes 105-1 through 105-M. The number of nodes shown in FIG. 1 is for illustrative purposes only. Fewer or greater numbers of nodes 105 may be employed in network 100 consistent with the present invention. Each node 105 of network 100 may route packets on behalf of other nodes and, thus, serve as an intermediate node between a packet source node and destination node in the network. Each node 105 may include an omni-directional antenna and one or more directional antennas (not shown) for transmitting and receiving packets.

EXEMPLARY NODE

Figure 2:
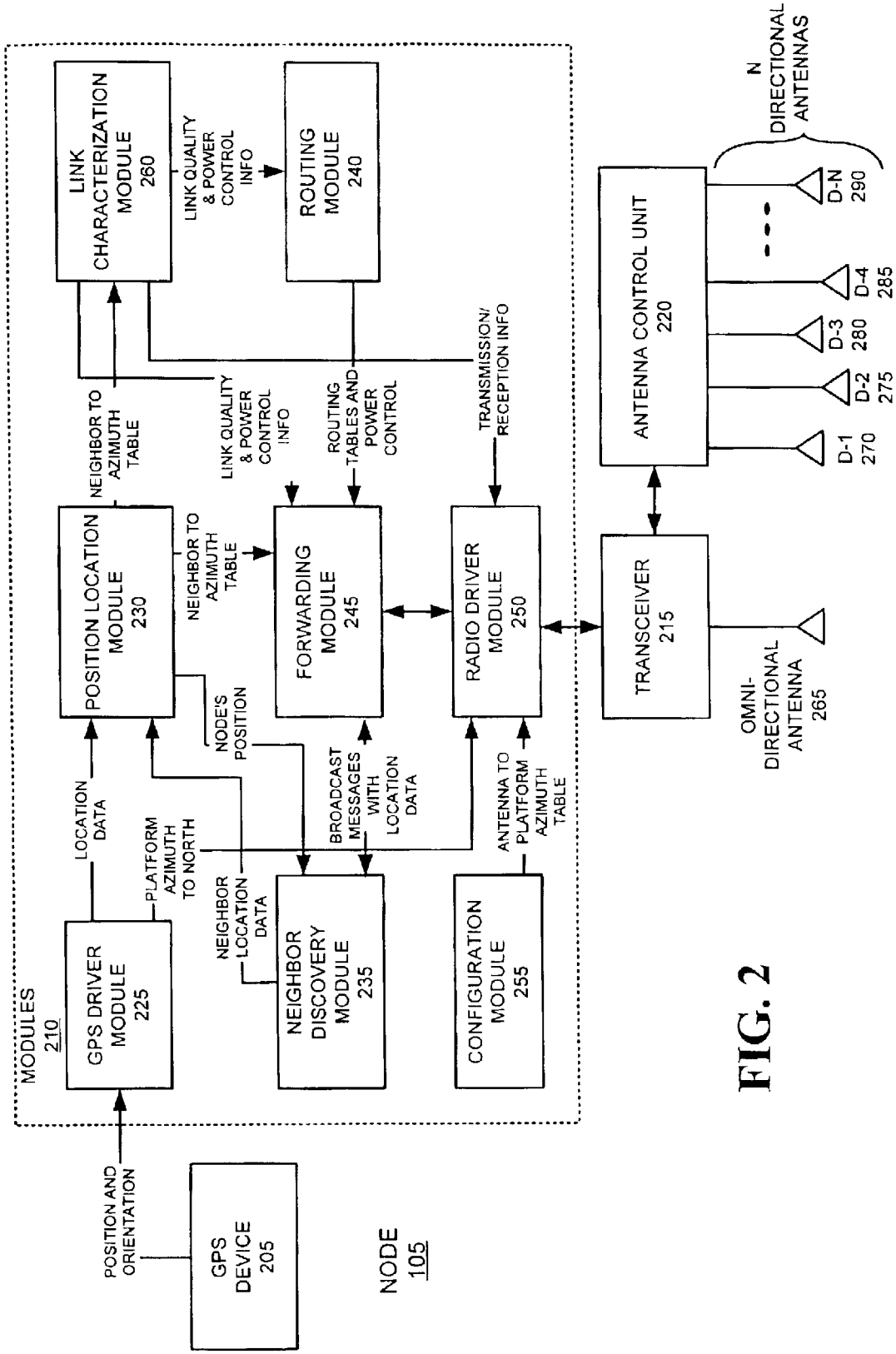
FIG. 2 illustrates exemplary components of a mobile node of the network of FIG. 1 consistent with the present invention.

FIG. 2 illustrates exemplary components of a node 105 of network 100. Node 105 may include a GPS device 205, a number of modules 210, a transceiver 215, and an antenna control unit 220. GPS device 205 may include conventional GPS circuitry for receiving GPS signals, and providing position and orientation data derived from the GPS signals to GPS driver module 225. Transceiver 215 may include conventional circuitry for transmitting and receiving radio signals via either omni-directional antenna 265 or the N directional antennas 270–290. As an alternative to omni-directional antenna 265, multiple directional antennas may be combined to have an omni-directional function. Transceiver 215 may select one or more antennas of the N directional antennas 270–290 via antenna control unit 220 for transmission or reception. Antenna control unit 220 may include, for example, an antenna switch for a switched beam type of directional antenna. Alternatively, antenna control unit 220 may include, for example, steering control for a steered beam type of directional antenna.

Modules 210 may include various modules, each of which may be implemented in software, hardware and/or firmware. If implemented in software, modules 210 may include instructions stored in a computer-readable medium, such as, for example, stored in or on random access memory (RAM), read only memory (ROM), a CD-ROM, or a diskette, for execution by a processing unit (not shown) such as, for example, a microprocessor. Modules 210 may include a GPS driver module 225, a position location module 230, a neighbor discovery module 235, a routing module 240, a forwarding module 245, a radio driver module 250, a configuration module 255 and a link characterization module 260.

GPS driver module 225 may receive position and orientation data from GPS device 205 and may determine a latitude and longitude that corresponds to the position and orientation data. GPS driver module 225 may further, based on historical position and orientation data received from the GPS device, determine a current heading of node 105. In addition to, or as an alternative to, conventional GPS mechanisms, module 225 may determine its location using any conventional technique for determining location. Such techniques may include, but are not limited to, determining location using conventional cellular network "E-911" location services or determining location by performing triangulation of signals transmitted by, for example, AM radio stations. Such techniques may further include a "dead reckoning" technique in which an initial location is known, and movement from that initial location may be tracked through knowledge of the distances and headings traversed from the initial location. Other techniques, such as using existing vehicle navigation systems, may also be used.

Position location module 230 may keep track of node 105's position, and the position of other nodes 105 of network 100. Position location module 230 may provide node 105's position to neighbor discovery module 235. Neighbor discovery module 235 may pass neighbor location data received via forwarding module 245 and radio driver module 250 to position location module 230. Neighbor discovery module 235 may also place node 105's location into messages that are to be transmitted, for example, via omni-directional antenna 265. Neighbor discovery module 235 may also place node 105's location into messages that are to be transmitted via a single, or multiple antennas, of N directional antennas 270–290.

Routing module 240 may construct routing tables in accordance with network 100 routing protocols. To assist in constructing routing tables, routing module 240 may receive link quality and power control information from link characterization module 260. Forwarding module 245 may consult routing tables provided by routing module 240 to construct and forward packets to appropriate destinations via neighboring nodes of network 100.

Radio driver module 250 may implement the Medium Access Layer (MAC) protocol and may determine the appropriate antenna of N directional antennas 270–290 for transmitting outgoing packets. Configuration module 255 may store data for configuring radio driver module 250. Such data may include, for example, one or more data tables that indicate the orientation of the N antennas 270–290 relative to node 105's platform. Link characterization module 260 may determine link quality and power control information related to transmitting and receiving packets to and from neighboring nodes of network 100.

EXEMPLARY ANTENNA TO PLATFORM AZIMUTH TABLE

FIG. 3 illustrates an exemplary table 300 that indicates, consistent with the present invention, the orientation of each of the N directional antennas 270–290 relative to a platform of a node 105. Table 300 may be stored in a memory device associated with a node 105. Table 300 may include multiple entries 305, each of which may include an antenna number 310, an antenna type 315, a platform azimuth minimum 320, a platform azimuth maximum 325, and a platform azimuth center 330. Antenna number 310 may include a value that uniquely identifies an antenna of N directional antennas 270–290. Antenna type 315 may indicate a type of the antenna identified by antenna number 310.

Platform azimuth minimum 320 and platform azimuth maximum 325 may represent the range of the antenna gain pattern associated with the antenna identified by antenna number 310. This range may not necessarily represent the 3 dB main lobes of the antenna gain pattern, but may represent an approximate range of azimuth values appropriate for transmitting a packet. Platform azimuth minimum 320 may include an angle, referenced to node 105's platform, that indicates a minimum angle of an antenna gain pattern associated with the antenna identified by antenna number 310. Platform azimuth maximum 325 may include an angle, referenced to node 105's platform, that indicates a maximum angle of the antenna gain pattern associated with the antenna identified by antenna number 310. Platform azimuth minimum 320 and platform azimuth maximum 325 values associated with all the entries of table 300 may include gaps in coverage of the N directional antennas 270–290. In the case of gaps in antenna coverage, node 105 may use omni-directional antenna 265 for transmitting and/or receiving packets. Platform azimuth center 330 may indicate a center angle that describes the direction the antenna identified by antenna number 310 is pointing relative to node 105's platform.

EXEMPLARY NEIGHBOR TO NORTH AZIMUTH TABLE

FIG. 4 illustrates an exemplary table 400 that indicates, consistent with the present invention, a heading associated with each of the neighboring nodes of a node 105 of network 100. Table 400 may be stored in a memory device associated with a node 105. Table 400 may include multiple entries 405, each of which may include a neighbor identifier 410 and a north azimuth 415. Neighbor identifier 410 may uniquely identify a neighboring node 105 of network 100. Neighbor identifier 410 may, for example, include a MAC address associated with a neighboring node. North azimuth 415 may include a value in, for example, radians that represents an angle measured clockwise from true north from node 105 to the neighboring node identified by neighbor identifier 410. Entries 405 of table 400 may be aged based on the time a previous update for each entry was received. The aging of each entry 405 may occur according to a configurable timer.

EXEMPLARY NODE LOCATION TRANSMISSION PROCESS

Figure 5:
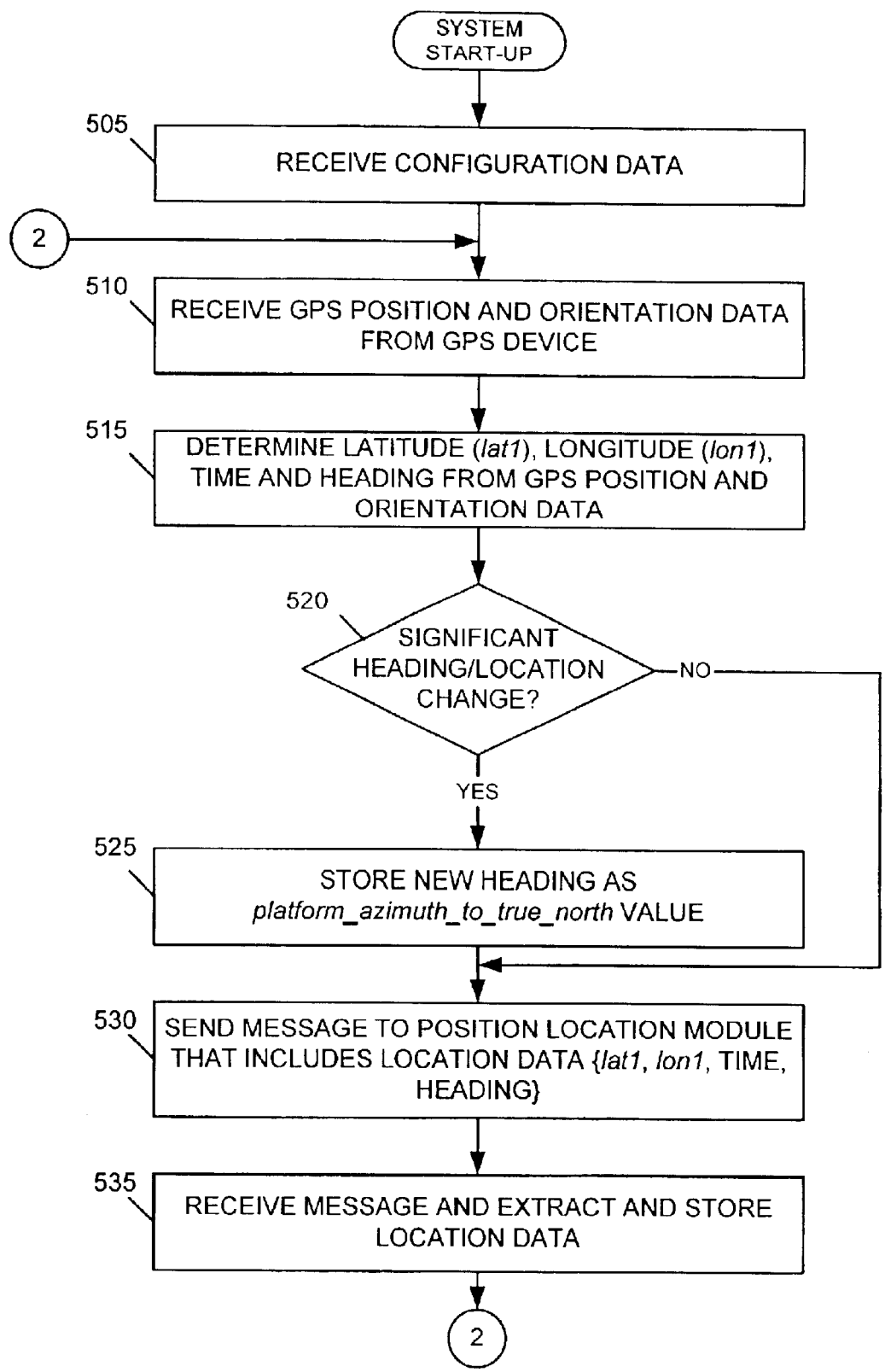
FIGS. 5–6 are flow charts that illustrate a node location transmission process consistent with the present invention.
Figure 6:
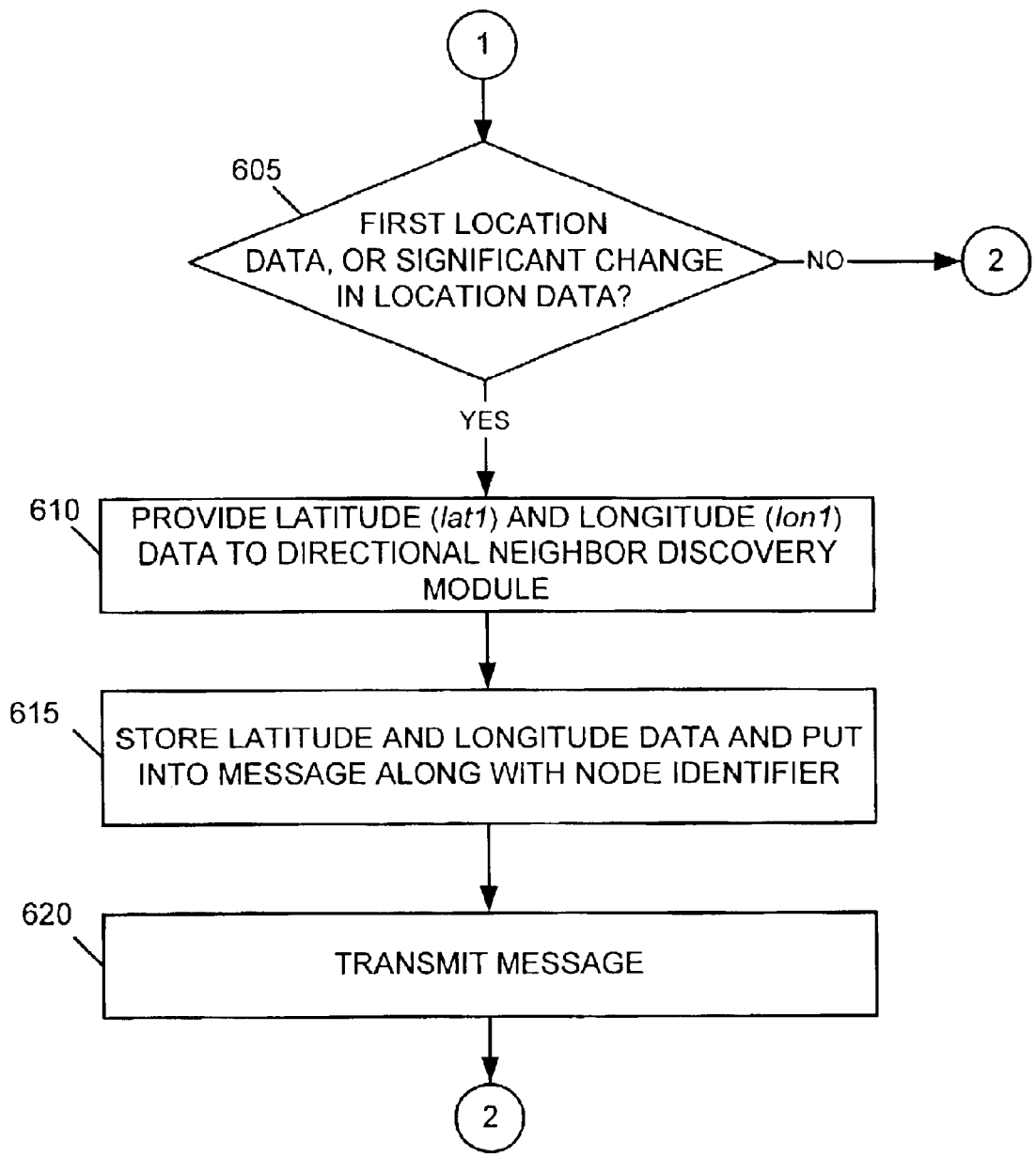

FIGS. 5–6 are flowcharts that illustrate an exemplary process, consistent with the present invention, for transmitting a current location of a node 105. As one skilled in the art will appreciate, the process exemplified by FIGS. 5–6 can be implemented as a sequence of instructions and stored in a memory associated with node 105 for execution by a processing unit. Alternatively, the process exemplified by FIGS. 5–6 can be implemented in hardware and/or firmware. The exemplary process may begin with receipt of configuration data [act 505]. GPS driver module 225 may receive the configuration data from position location module 230. The configuration data may include, for example, an indication of how often GPS driver module 225 should provide GPS position and orientation data to position location module 230. GPS driver module 225 may then periodically receive the GPS data from GPS device 205 [act 510]. GPS driver module 225 may determine a latitude (lat1), longitude (lon1), heading and a time from the received GPS position and orientation data [act 515]. From the determined heading, GPS driver module 225 may determine whether there has been a significant heading change, or a significant change in location (i.e., significant change in lat1 and/or lon1), for node 105 [act 520]. If not, the exemplary process may continue at act 530 below. If there has been a significant heading or location change, then GPS driver module 225 may store the new heading as platform_azimuth_to_true_north value, indicating the angle of the heading of node 105 relative to true north [act 525]. GPS driver module 225 may then send a message to position location module 230 that includes the location data (e.g., lat1, lon1, time, heading) [act 530]. Position location module 230 may receive the message and extract and store the location data [act 535].

Position location module 230 may determine whether the extracted location data is the first received location data after system start-up, or whether the extracted location data represents a significant change in the location of node 105 [act 605](FIG. 6). If not, the exemplary process may return to act 510 above. If the location data is the first received location data, or represents a significant change in node 105's location, then position location module 230 may provide the latitude (lat1) and longitude (lon1) data to neighbor discovery module 235 [act 610]. Neighbor discovery module 235 may store the latitude and longitude data and put the data into an outgoing message along with node 105's node identifier [act 615]. Neighbor discovery module 235 may then send the message through forwarding module 245 and radio driver module 250 for transmission via omni-directional antenna 265 or via one, or multiple, antennas of N directional antennas 270–290 [act 620]. In some exemplary embodiments, the outgoing message may be transmitted via each directional antenna of N directional antennas 270–290 in a search light fashion. The outgoing message may include a message dedicated to carrying only location data (i.e., a location message). The outgoing message may further include any type of outgoing message, such as, for example, a data message, a Request-To-Send (RTS), a Clear-To-Send (CTS), or a network control message, onto which the location data and node identifier are "piggybacked."

EXEMPLARY NEIGHBOR NODE HEADING DETERMINATION PROCESS

Figure 7:
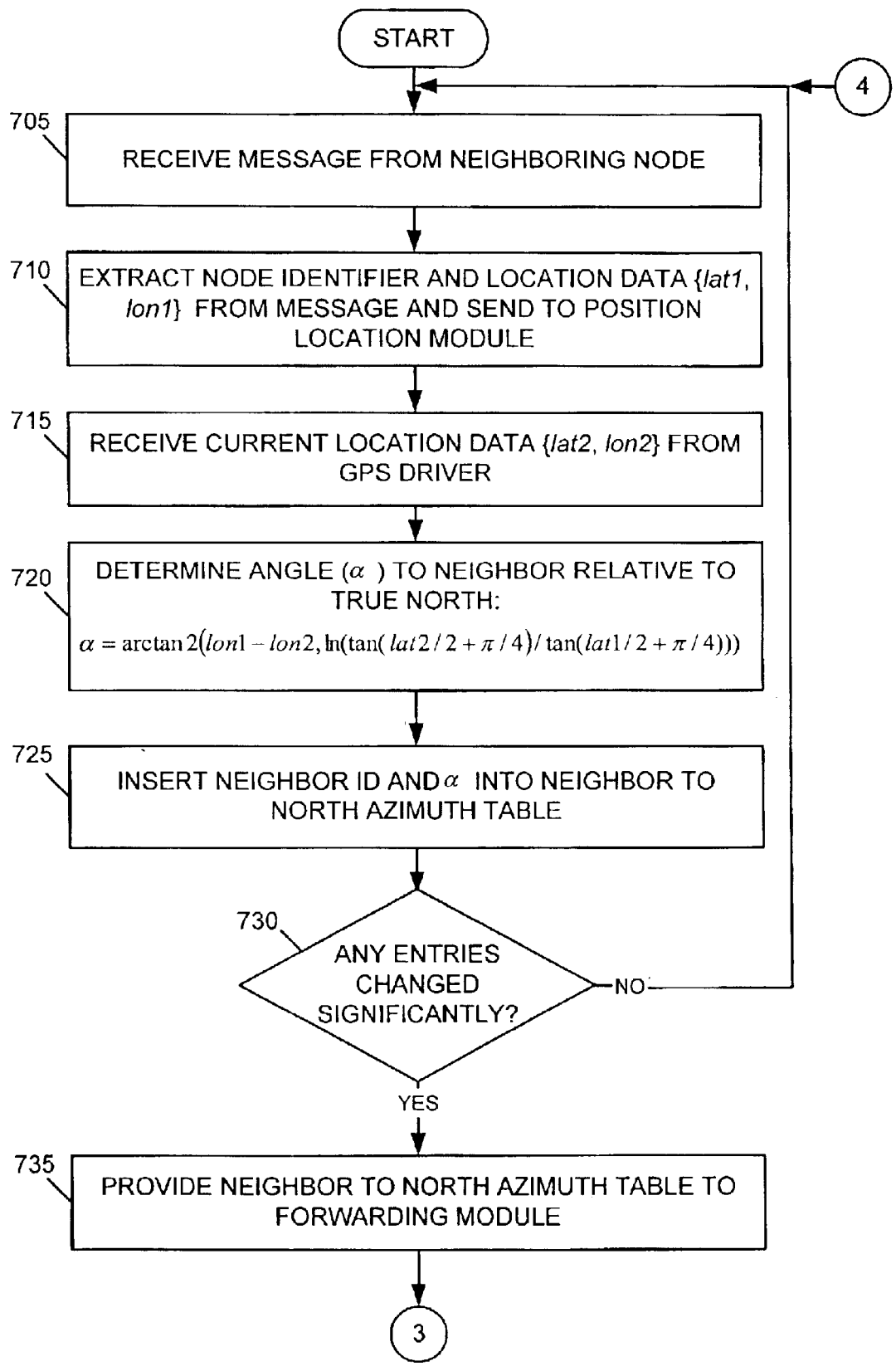
FIGS. 7–8 are flow charts that illustrate an exemplary process for determining a heading of a neighbor node relative to a reference heading consistent with the present invention.
Figure 8:
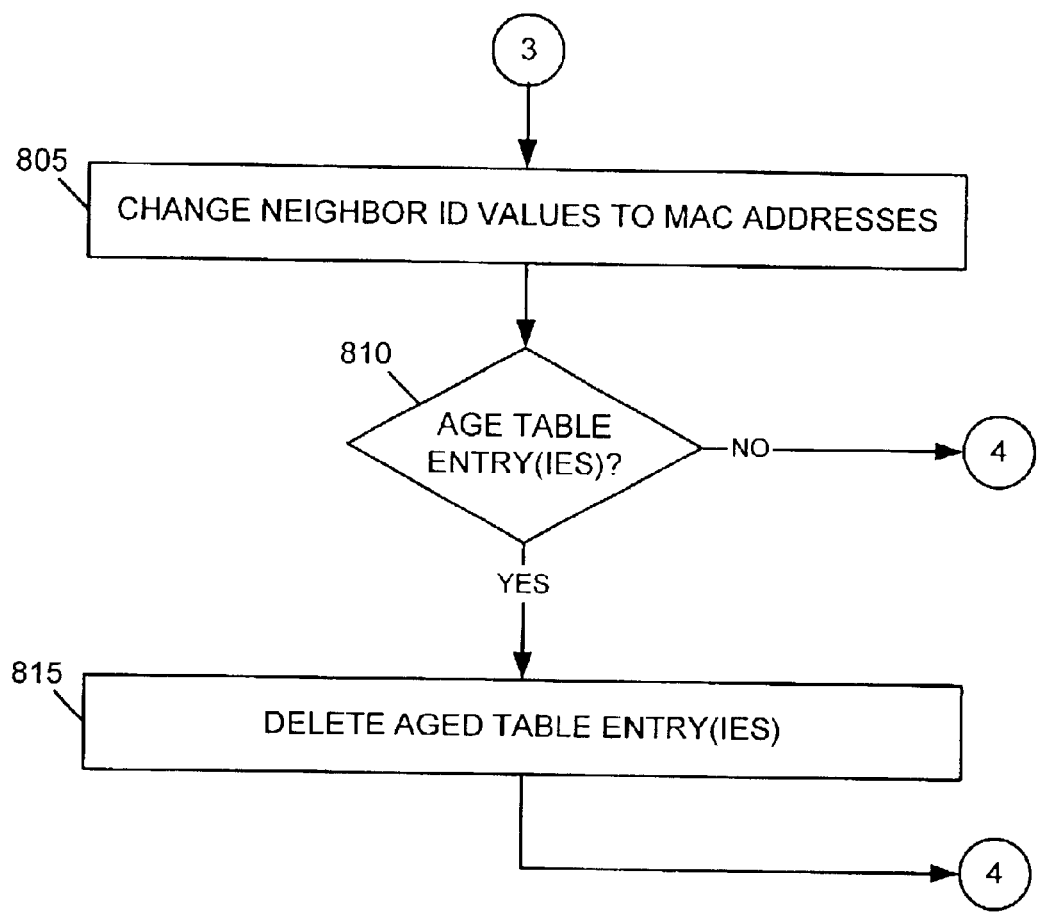

FIGS. 7–8 are flowcharts that illustrate an exemplary process, consistent with the present invention, for determining a heading of a neighbor node relative to a reference heading. As one skilled in the art will appreciate, the process exemplified by FIGS. 7–8 can be implemented as a sequence of instructions and stored in a memory associated with a node 105 for execution by a processing unit. Alternatively, the process exemplified by FIGS. 7–8 can be implemented in hardware and/or firmware.

The exemplary process may begin with the receipt of a message from a neighboring node 105 of network 100 that contains the neighboring node 105's location [act 705]. The message may include a dedicated location data message, or a data message, a RTS, a CTS, or a network control message with node identifier and location data "piggybacked" on the message. Neighbor discovery module 235 may receive the message via transceiver 215, radio driver module 250 and forwarding module 245. Neighbor discovery module 235 may extract a node identifier and location data {lat1, lon1} from the message and send the identifier and location data to position location module 230 [act 710]. Position location module 230 may further receive current location data {lat2, lon2} of the present node 105 from GPS driver 225 [act 715]. Position location module 230 may determine an angle (α) to the neighboring node relative to true north according to the following relation:

$$\alpha = \arctan 2(\text{lon1} - \text{lon2}, \ln(\tan(\text{lat2}/2 + \pi/4)/\tan(\text{lat1}/2 + \pi/4))) \quad \text{Eqn. (1)}$$

where ln represents a natural log, lat and lon values are in radians, and α is measured clockwise from true north in radians [act 720], arctan 2(y,x) is a known function that determines the arctangent of y/x, with the sign of both of the arguments x and y being used to determine the quadrant of the result. The result of the function is a value in radians between −π and π. Position location module 230 may insert the neighbor identifier and the determined angle α into neighbor to north azimuth table 400 as neighbor identifier 410 and north azimuth 415, respectively [act 725]. Position location module 230 may determine whether any entries of table 400 have changed significantly [act 730]. If so, the exemplary process may continue at act 735. If no entries of table 400 have changed significantly, then the exemplary process may return to act 705 above. Position location module 230 may provide a copy of the neighbor to north azimuth table 400 to forwarding module 245 [act 735]. Forwarding module 245 may change the neighbor identifier values 405 of table 400 into corresponding MAC addresses [act 805](FIG. 8). Forwarding module 245 may further determine whether to age any entries 405 of table 400 [act 810]. Forwarding module 245 may use a configurable timer associated with each entry 405 of table 400 for determining whether to age each entry 405. If any entries 405 of table arc to be aged, forwarding module 245 may delete the aged table entries of table 405 [act 815].

EXEMPLARY ANTENNA SELECTION PROCESS

Figure 9:
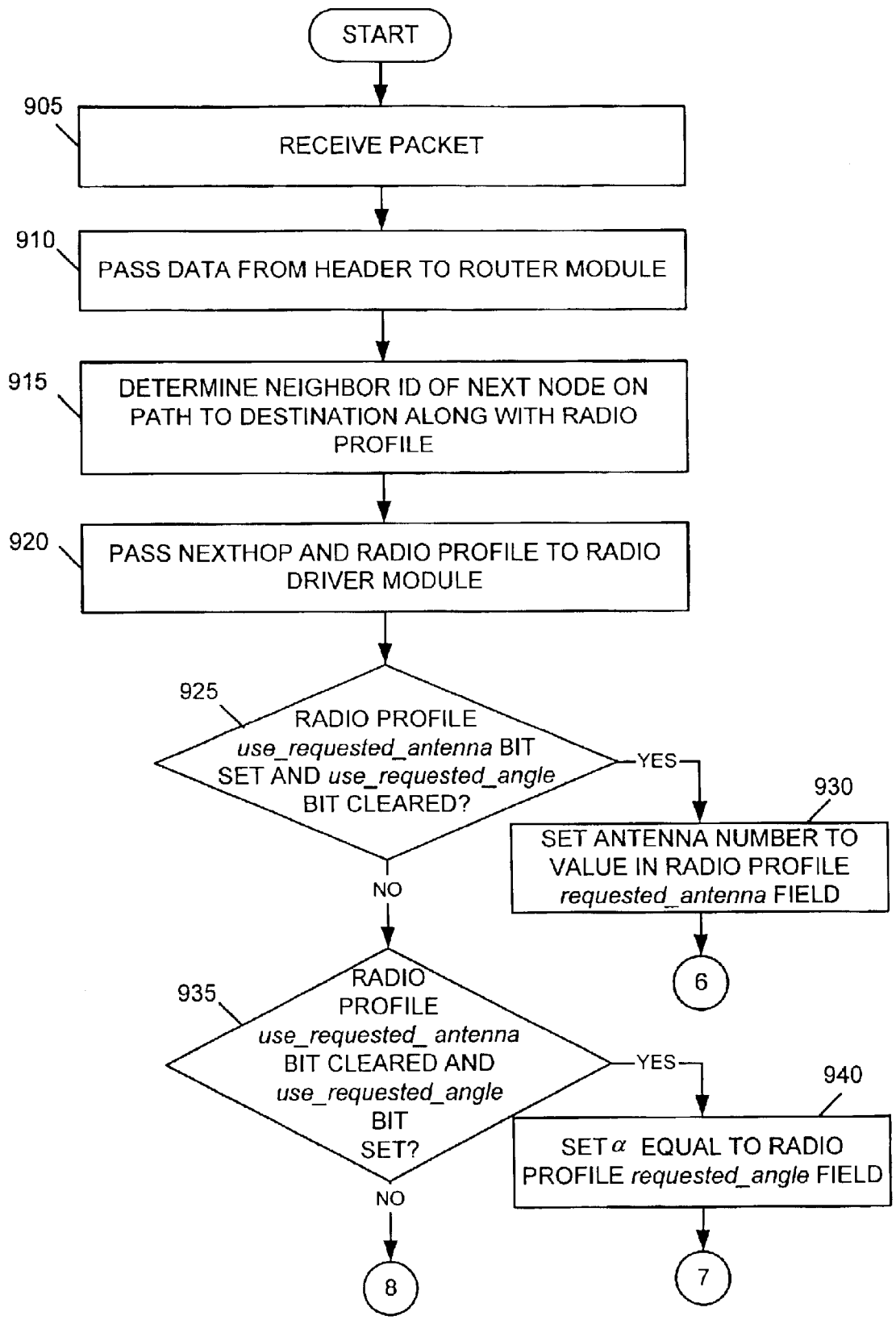
FIGS. 9–11 are flow charts that illustrate an exemplary process for selecting an antenna for transmitting data to a neighboring node consistent with the present invention.
Figure 10:
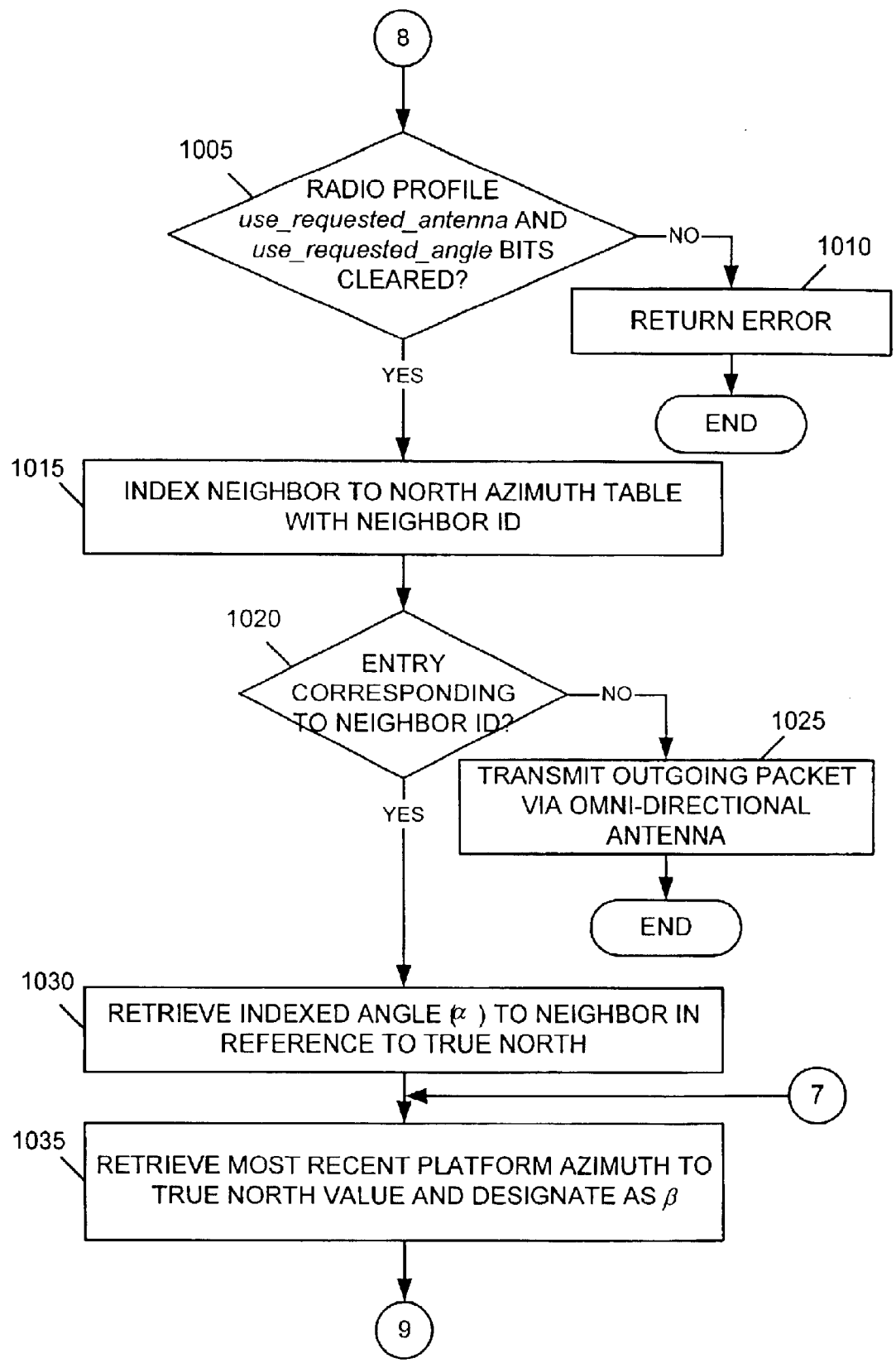
Figure 11:
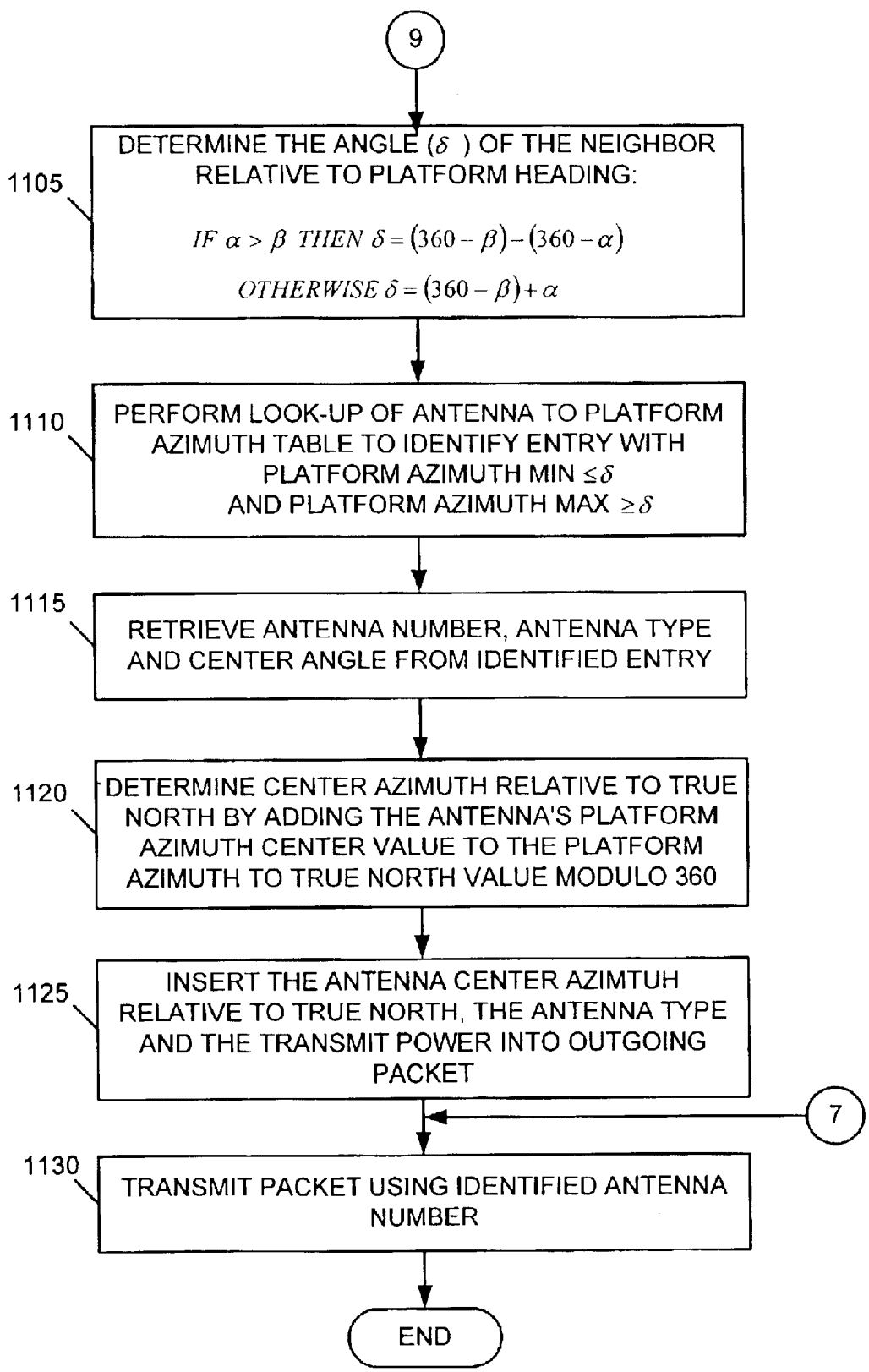

FIGS. 9–11 are flowcharts that illustrate an exemplary process, consistent with the present invention, for selecting an antenna of N directional antennas 270–290 for transmitting a packet to a neighboring node of network 100. As one skilled in the art will appreciate, the method exemplified by FIGS. 9–11 can be implemented as a sequence of instructions and stored in a memory associated with a node 105 for execution by a processing unit. Alternatively, the process exemplified by FIGS. 9–11 can be implemented in hardware and/or firmware.

The exemplary process may begin with the receipt of an incoming packet at a node 105 of network 100 [act 905]. The incoming packet may be received by radio driver module 250 via transceiver 215. Radio driver module 250 may pass the data from the packet's header to forwarding module 245 [act 910]. Forwarding module 245 may, using routing tables received from routing module 240, determine a neighbor identifier of a next node on a path to the packet's destination, along with a radio profile [act 915]. The radio profile may include a description of how the packet is to be processed by radio driver module 250. Routing module 240 may create the radio profile based on various factors, such as the type-of-service (ToS) values of the packet, pre-configured variables, and/or measurements on the link. For example, low priority packets might be designated to have a particular ToS value specified in the IP header.

When a packet with this value arrives, routing module 240 may pass the packet to radio driver module 250 along with a radio profile that indicates that the packet should be sent with a given priority, at a given frequency, or at a given radio power. The radio profile may further include a use_requested_antenna bit, a use_requested_angle bit, a requested_antenna field, and a requested_angle field. The use_requested_antenna bit may indicate whether an antenna specified by requested_antenna field should be used for transmitting the received packet. The use_requested_angle bit may indicate whether an angle a contained in the requested_angle field should be used for transmitting the received packet. The angle α may include the heading, referenced to true north, from node 105 to a next hop neighbor node to which the received packet should be transmitted. The use_requested_antenna bit, use_requested_angle bit, requested_antenna field, and requested_angle field of the radio profile may be specified by networking protocols associated with network 100 based on, for example, the type of packet being sent.

Forwarding module 245 may pass the next hop node neighbor identifier and the radio profile to radio driver module 250 [act 920]. Radio driver module 250 may determine if the radio profile use_requested_antenna bit is set and the use_requested_angle bit is cleared [act 925]. If so, radio driver module 250 may set a number identifying the antenna to be used for transmitting the packet to the value in the radio profile requested_antenna field [act 930].

Otherwise, radio driver module 250 may determine if the radio profile use_requested_antenna bit is cleared and the use_requested_angle bit is set [act 935]. If so, radio driver module 250 may set an angle α to the value in the radio profile requested_angle field [act 940]. Otherwise, radio driver module 250 may determine if both of the use_requested_antenna and use_requested_angle bits of the radio profile are cleared [act 1005](FIG. 10). If not, then radio driver module 250 may return an error [act 1010]. If both of the use_requested_antenna and use_requested_angle bits are cleared, then radio driver module 250 may index the neighbor to north azimuth table 400 with the neighbor identifier to determine an angle (i.e., north azimuth value 415) from the current node 105 to the neighboring node relative to true north [act 1015]. Radio driver module 250 may determine if there is an entry in table 400 that corresponds to the neighbor identifier [act 1020]. If not, the outgoing packet may be transmitted via omni-directional antenna 265 [act 1025].

If there is an entry in table 400 that corresponds to the neighbor identifier 410, then radio driver module 250 may retrieve the angle (α) specified by the north azimuth value 415 that is indexed by the neighbor identifier 410 [act 1030]. Radio driver module 250 may retrieve the most recent platform_azimuth_to_true_north value and designate the value as β [act 1035]. Radio driver module 250 may determine an angle (δ) of the neighbor relative to the platform heading [act 1105](FIG. 11) in accordance with the following:

If α>β then δ=(360−β)−(360−α)

otherwise δ=(360−β)+α.

Radio driver module 250 may perform a look-up of antenna to platform azimuth table 300 to identify an entry 305 with platform azimuth min 320$^{\leq \delta}$ and platform azimuth max 330$^{\geq \delta}$ [act 1110]. Radio driver module 250 may retrieve an antenna number 310, antenna type 315 and platform azimuth center value 330 from the identified entry 305 [act 1115]. Radio driver module 250 may determine a center azimuth relative to true north value (center_azimuth_ relative_to_true_north) by adding the platform azimuth center value 325 to the platform_azimuth_to_true_north value modulo 360 [act 1120]. Radio driver module 250 may insert the center_azimuth_relative_to_true_north value, the antenna type 315, and the transmit power into the outgoing packet [act 1125]. Radio driver module 250 may initiate the transmission of the outgoing packet via transceiver 215, antenna control unit 220, and an antenna of the N directional antennas that corresponds to the identified antenna number [act 1130].

CONCLUSION

Systems and methods consistent with the present invention, therefore, provide mechanisms for selectively transmitting and/or receiving data via directional antennas at nodes in an ad-hoc, multi-hop wireless network. Consistent with the present invention, directional antennas, such as, for example, switched beam or steered beam types of directional antennas, may be used for transmitting and/or receiving packets. Based on determined locations of neighboring nodes in the ad-hoc network, a node may select an appropriate antenna of multiple directional antennas for transmitting and/or receiving data to/from other nodes in the ad-hoc network. Use of multiple directional antennas with an ad-hoc network permits the effective division of the shared frequency space into smaller regions, thus, increasing spatial re-use in the network. Increasing the spatial re-use results in higher throughput and lower latencies in the network.

The foregoing description of embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 5–11, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of selecting an antenna for transmitting data in an ad-hoc wireless network, comprising:
   receiving a first message from a node in the ad-hoc wireless network, the message comprising location data associated with the node;
   selecting an antenna from a plurality of antennas based on the location data; and
   transmitting a second message to the node via the selected antenna, wherein the second message comprises a type of the selected antenna and a center angle of the selected antenna relative to a platform from which the second message is transmitted.

2. The method of claim 1, wherein the plurality of antennas comprise a plurality of directional antennas and the selected antenna comprises a directional antenna of the plurality of directional antennas.

3. The method of claim 1, further comprising:
   determining a heading to the node using the location data, wherein selecting the antenna from the plurality of antennas is further based on the determined heading.

4. The method of claim 3, wherein the determined heading is referenced to true north.

5. A computer-readable medium containing instructions for controlling at least one processor to perform a method of selecting an antenna for transmitting a message to a node in an ad-hoc wireless network, the method comprising:
   receiving data associated with a location of the node;
   selecting a directional antenna from a plurality of directional antennas based on the data; and
   transmitting a message to the node via the selected directional antenna, wherein the message comprises a type of the selected antenna and a center angle of the selected antenna relative to a platform from which the second message is transmitted.

6. A first node in an ad-hoc wireless network, comprising:
   a transceiver coupled to a plurality of directional antennas and to an omni-directional antenna;
   a memory configured to store instructions; and
   a processor configured to execute the instructions in the memory to:
      receive, via the omni-directional antenna, data associated with a location of a second node in the ad-hoc wireless network,
      select a directional antenna from the plurality of directional antennas based on the received data, and
      transmit data to the second node via the selected directional antenna, wherein the data comprises a type of the selected antenna and a center angle of the selected antenna relative to a platform from which the data is transmitted.

7. A method for selecting a transmit antenna in a wireless network comprising a plurality of nodes, the method comprising:
   receiving a message from a first node of the plurality of nodes, the message comprising location data associated with the first node;
   determining an angle from a second node of the plurality of nodes to the first node, based on the location data, to produce a determined angle;
   selecting an antenna from a plurality of antennas for transmitting data to the first node based on the determined angle; and
   transmitting the data via the selected antenna, wherein the data comprises a of the selected antenna and a center angle of the selected antenna relative to a platform from which the data is transmitted.

8. The method of claim 7, wherein the plurality of antennas comprises a plurality of directional antennas and wherein the selected antenna comprises a directional antenna of the plurality of directional antennas.

9. The method of claim 8, wherein each of the plurality of directional antennas point in a different direction relative to a platform associated with the second node.

10. The method of claim 9, wherein selecting the antenna further comprises:

matching the determined angle with an antenna of the plurality of antennas that points in a direction corresponding to the determined angle.

11. The method of claim 9, further comprising:
maintaining a data table specifying antenna gain patterns associated with each of the plurality of directional antennas.

12. The method of claim 11, wherein selecting an antenna from the plurality of directional antennas comprises:
performing a look-up of the data table using the determined angle.

13. A computer-readable medium containing instructions for controlling at least one processor to perform a method for selecting a transmit antenna in a wireless network comprising a plurality of nodes, the method comprising:
receiving data associated with a location of a first node of the plurality of nodes;
determining an angle from a second node of the plurality of nodes to the first node, based on the location data, to produce a determined angle;
selecting an antenna from a plurality of antennas for transmitting data to the first node based on the determined angle; and
initiating transmission of the data via the selected antenna, wherein the data comprises a type of the selected antenna and a center angle of the selected antenna relative to a platform from which the data is transmitted.

14. A first node in a wireless ad-hoc network comprising a plurality of nodes, comprising:
a plurality of directional antennas;
an omni-directional antenna;
a memory configured to store instructions; and
a processor configured to execute the instructions in the memory to:
receive, via the omni-directional antenna, data associated with a location of a second node of the plurality of nodes;
determine an angle from the first node to the second node, based on the location data, to produce a determined angle;
select a directional antenna from the plurality of directional antennas for transmitting data to the second node based on the determined angle; and
initiate the transmission of the data via the selected directional antenna, wherein the data comprises a type of the selected directional antenna and a center angle of the selected directional antenna relative to a platform from which the data is transmitted.

15. A method of notifying other nodes in an ad-hoc multi-hop wireless network of a first node's location, comprising:
determining a current heading and current location of the first node;
determining whether the current heading of the first node differs from a previous heading of the first node; and
sending at least one message to the other nodes, based on whether the first node's current heading differs from the previous heading, the at least one message comprising information identifying the current location of the first node.

16. The method of claim 15, wherein the current location is derived from Global Positioning System (GPS) signals.

17. The method of claim 15, wherein the current location comprises latitude and longitude data.

18. The method of claim 15, wherein the at least one message further includes an identifier identifying the first node.

19. The method of claim 15, wherein the at least one message comprises at least one of a Request-to-Send (RTS) message and a Clear-To-Send (CTS) message.

20. The method of claim 15, wherein sending the at least one message further comprises sending the at least one message via an omni-directional antenna associated with the first node.

21. A computer-readable medium containing instructions for controlling at least one processor to perform a method of notifying neighboring nodes in an ad-hoc multi-hop wireless network of a first node's location, the method comprising:
determining a current heading and current location of the first node;
determining whether the current heading of the first node differs from a previous heading of the first node; and
sending at least one message to the neighboring nodes, based on whether the first node's current heading differs from the previous heading of the first node, to notify the neighboring nodes of the first node's current location.

22. A first node in an ad-hoc multi-hop wireless network comprising a plurality of nodes, comprising:
a transceiver;
a memory configured to store instructions; and
a processor configured to execute the instructions in the memory to:
determine a current heading and current location of the first node;
determine whether the current heading of the first node differs from a previous heading of the first node; and
send, via the transceiver, at least one message to at least one other node of the plurality of nodes, based on whether the first node's current heading differs from the previous heading, to notify the other mobile nodes of the first node's current location.

23. A method of determining a heading to a first node in an ad-hoc wireless network, comprising:
receiving a message from the first node, the message comprising an identifier associated with the first node and data indicating a location of the first node, wherein the location comprises latitude(lat1) and longitude (lon1) data;
determining a current location of a second node, wherein the current location of the second node comprises latitude (lat2) and longitude (lon2) data;
determining a heading of the first node relative to the second node, based on the location of the first node, to produce a determined heading, wherein the heading comprises an angle $\alpha$, and wherein:

$$\alpha = \arctan 2(lon1-lon2, \ln(\tan(lat2/2+\pi/4)/\tan(lat1/2+\pi/4)))$$

wherein ln represents a natural log,
lat and lon values are in radians, and
$\alpha$ is measured clockwise from true north in radians; and
storing the identifier and determined heading in an entry of a data.

24. The method of claim 23, further comprising:
aging the entry after a configurable time period.

25. A computer-readable medium containing instructions for controlling at least one processor to perform a method of determining a heading to a first mobile node in an ad-hoc wireless network, the method comprising:

receiving a message from the first mobile node, the message comprising an identifier associated with the first mobile node and data indicating a location of the first mobile node, wherein the location comprises latitude(lat1) and longitude (lon1) data;

determining a current location of a second mobile node, wherein the current location of the second mobile node comprises latitude (lat2) and longitude (lon2) data;

determining a heading of the first mobile node relative to the second mobile node, based on the location of the first mobile node, to produce a determined heading, wherein the heading comprises an angle α, and wherein $$\alpha=\arctan 2(\text{lon1}-\text{lon2}, \ln(\tan(\text{lat2}/2+\pi/4)/\tan(\text{lat1}/2+\pi/4)))$$

wherein ln represents a natural log,
lat and lon values are in radians, and
α is measured clockwise from true north in radians; and storing the identifier and determined heading of the first node.

26. A first node in a wireless network comprising a plurality of nodes, comprising:

a transceiver;

a memory configured to store instructions and a data table; and a processor configured to execute the instructions in the memory to:

receive, via the transceiver, data indicating an identifier associated with a second node of the plurality of nodes and a location of the second node, wherein the location comprises latitude(lat1) and longitude (lon1) data, determine a current location of the first node, wherein the current location of the first node comprises latitude (lat2) and longitude (lon2) data;

determine a heading of the second node relative to the first node, based on the location of the second node, to produce a determined heading, wherein the heading comprises an angle α, and wherein $$\alpha=\arctan 2(\text{lon1}-\text{lon2}, \ln(\tan(\text{lat2}/2+\pi/4)/\tan(\text{lat1}/2+\pi/4)))$$

wherein ln represents a natural log,
lat and lon values are in radians, and
α is measured clockwise from true north in radians; and store the identifier and determined heading in an entry of the data table.

27. A system for selecting a transmit antenna in a wireless network comprising a plurality of nodes, the method comprising:

mean for receiving a message from a first node of the plurality of nodes, the message comprising located with the first node;

mean for determining an angle from a second node of the plurality of nodes to the first node to produce a determined angle;

mean for selecting an antenna from a plurality of antennas for transmitting data based on the determined angle; and means for transmitting the data via the selected antenna, wherein the data comprises a type of the selected antenna and a center angle of the selected antenna relative to a platform from which the data is transmitted.

* * * * *